United States Patent
Sintorn

(10) Patent No.: US 7,766,138 B2
(45) Date of Patent: Aug. 3, 2010

(54) ARRANGEMENT FOR TELESCOPIC FORK LEG WITH PARALLEL DAMPING

(75) Inventor: Torkel Sintorn, Vaxholm (SE)

(73) Assignee: Ohlins Racing AB, Upplands Vasby (SE)

( * ) Notice: Subject to any disclaimer, the term of this patent is extended or adjusted under 35 U.S.C. 154(b) by 0 days.

(21) Appl. No.: 12/090,337

(22) PCT Filed: Oct. 18, 2006

(86) PCT No.: PCT/SE2006/001187

§ 371 (c)(1),
(2), (4) Date: Sep. 24, 2008

(87) PCT Pub. No.: WO2007/046750

PCT Pub. Date: Apr. 26, 2007

(65) Prior Publication Data

US 2009/0145706 A1    Jun. 11, 2009

(30) Foreign Application Priority Data

Oct. 19, 2005    (SE)    .................... 0502310

(51) Int. Cl.
*F16F 9/44* (2006.01)
*B62K 21/00* (2006.01)
(52) U.S. Cl. .................... 188/322.2; 280/276
(58) Field of Classification Search ........... 188/315, 188/318, 322.21, 322.2; 280/275, 276
See application file for complete search history.

(56) References Cited

U.S. PATENT DOCUMENTS

| | | | | |
|---|---|---|---|---|
| 3,795,291 A * | 3/1974 | Naito et al. | ................. | 188/274 |
| 4,936,424 A * | 6/1990 | Costa | ................. | 188/314 |
| 6,029,958 A * | 2/2000 | Larsson et al. | ................. | 267/113 |
| 6,286,642 B1 * | 9/2001 | Yi | ................. | 188/319.2 |
| 6,568,664 B2 * | 5/2003 | Furuya | ................. | 267/64.26 |
| 6,604,751 B2 * | 8/2003 | Fox | ................. | 280/276 |
| 7,163,223 B2 * | 1/2007 | Wesling et al. | ................. | 280/276 |
| 7,413,062 B2 * | 8/2008 | Vandewal | ................. | 188/266.5 |
| 7,441,638 B2 * | 10/2008 | Hanawa | ................. | 188/314 |
| 7,513,490 B2 * | 4/2009 | Robertson | ................. | 267/64.15 |
| 2009/0115159 A1 * | 5/2009 | Sintorn | ................. | 280/276 |

FOREIGN PATENT DOCUMENTS

| | | | |
|---|---|---|---|
| EP | 0322608 A2 | 7/1989 | |
| EP | 1505315 A2 | 2/2005 | |

OTHER PUBLICATIONS

International Search Report; dated Jan. 22, 2007; 3 pages.

* cited by examiner

*Primary Examiner*—Christopher P Schwartz
(74) *Attorney, Agent, or Firm*—Knobbe, Martens, Olson & Bear, LLP

(57) ABSTRACT

A device for telescopic fork legs, preferably for a motorcycle or bicycle. The device is a compact removable unit that comprises parallel medium flow passages that run between upper and lower sides of the piston. This unit that is simple to adapt to different front fork dimensions and to use as a kit for providing an existing front fork with parallel damping. Parallel damping achieves simple adaptation of the damping characteristics to different types of terrain.

15 Claims, 6 Drawing Sheets

ARRANGEMENT FOR TELESCOPIC FORK LEG WITH PARALLEL DAMPING

CROSS-REFERENCE TO RELATED APPLICATIONS

This application is a U.S. National Phase of International application No. PCT/SE2006/001187, filed Oct. 18, 2006, which is based upon Swedish Patent Application No. 0502310-6, filed Oct. 19, 2005, each of which is hereby incorporated by reference in its entirety and priority is claim to each of these applications.

BACKGROUND OF THE INVENTION

1. Field of the Invention

The present invention relates to a device for telescopic fork legs, preferably on a motorcycle or bicycle, where the telescopic fork leg comprises outer and inner legs and a damping system with a piston and piston rod arrangement that is arranged within these.

2. Description of the Related Art

A front fork for a motorcycle or a bicycle can be subjected to wheel speeds in the whole range of 0-10 m/s and stroke lengths of up to 300 mm. In order to be able to absorb such high speeds and such large strokes, great demands are made of the front fork. It must be able to absorb forces and be strong, while at the same time it must be able to handle a large flow of oil. It is also desirable to have good control in the whole range of speeds and for the damping to be adjustable. A compact and light system that can be adapted to fit several different front fork dimensions also is desired. Reference is made, for example, to patent U.S. Pat. No. 6,260,832, that shows a front fork of the type described above. U.S. Pat. No. 6,260,832 does not, however, have the desirable build-up of pressure that is described below.

Current systems can be represented by a damper of the De Carbon type, see for example FR1055443A, and have a serial damping force construction that is based on a principle of pressurizing two locations in series in order to avoid cavitation or the admixture of air into the damping medium. This system has limitations in that the pressures in the two pressurizing locations must more or less harmonize with each other, as the drop in pressure ($\Delta P1=P_{low}-P_{mid}$, $\Delta P2=P_{mid}-P_{gas}$) across the two pressurizing pistons should be greater than zero in order not to create cavitation. See FIG. 1. Because the drop in pressure across the piston is dependent upon the flow resistance through the piston in combination with the force that acts on the piston, the flow resistance, controlled for example by a shims stack, can only be adjusted within a certain limited range, which thus also results in a limited area of use for the damper. It is then also necessary to dimension pistons, piston rod and damping tubes so that the force absorption agrees with the pressures that have been built up, in order to obtain the required damping. With serial damping, the oil is forced through both of the valves in series, which results in high flow speeds. With high flow speeds and high piston speeds, the design of the pistons is limited in order not to obtain an unwanted uncontrolled build-up of pressure due solely to the flow resistance.

A system with parallel damping solves the abovementioned problem. Examples of such dampers can be found in the patent documents EP1505315A2 and EP0322608A2. The parallelism in the damping arises through the damping medium being pressurized by two pressurizing pistons that are arranged parallel to each other in the damping chamber and in a space arranged outside the damping chamber. The pressurized outer space is interconnected with both the compression chamber and the return chamber. With parallel damping, the pressure on the low-pressure side of the damping piston is always as large as possible, irrespective of whether the front fork is subjected to a compression or a return stroke. The definition of the low-pressure side of the damping piston is the side of the piston where the volume of the chamber increases. Due to the fact that the pressure is never allowed to become zero on that side, cavitation is prevented. This parallel arrangement also means that the damper can be pressurized and the pressure, that is the damping, can be adjusted without having to take into account the drop in pressure across the piston(s). The increase in pressure, as well as the increase in force, now takes place without cavitation, irrespective of the setting.

SUMMARY OF THE INVENTION

The designs according to EP1505315A2 and EP0322608A2 are adapted for shock absorbers that are not subjected to the same forces and impacts as a front fork. A device is thus required for a front fork that comprises adjustable parallel damping. It is also advantageous if the device is able to be adjusted to suit different front fork dimensions and can be used as a kit for modifying an existing front fork.

A telescopic fork leg that is arranged and configured in accordance with certain features, aspects and advantages of some embodiments of the present invention may comprise an outer and an inner leg and a damping system arranged within these. The damping system comprises damping system components that are acted upon by the flow of medium caused by the compression and expansion movements of the main piston. The damping system components together form a compact unit that comprises parallel medium flow passages for the flow between the upper and lower sides of the main piston and the flow that is caused by the pressurizing device that pressurizes the whole damping system. The medium flow passages are arranged parallel to each other in order to ensure low flow speeds between the said sides of the main piston and thereby prevent the uncontrollable build-up in pressure and force on the sides of the piston as a result of the rapid movements and large strokes of the front fork. In each damping system component, the flow through one or both of the respective medium flow passages can be arranged so that it can be adjusted or selected by means of devices, for example valves, in order to achieve, for example, matching of the damping characteristics to different types of terrain, by means of an exceptionally wide range of settings. This wide range of settings is achieved by the medium flow passages comprising separate connections to a common pressure build-up location where the pressure is created by the abovementioned pressurizing device.

In accordance with certain features, aspects and advantages of some embodiments of the present invention, the damping system components comprise two concentric tubes in the form of a damping tube and an outer tube that is arranged around the damping tube. The tubes together form a portion of a removable insert system in the front fork. The insert system creates a double tube function in which the damping medium can flow in parallel as a result of the duct between the damping tube and the outer tube being used to connect together the two chambers and the common pressurizing location. The pressurizing location is connected to the medium flow passages between the damping cylinder and the outer tube via a head that also comprises valves for adjusting the flow of the medium. This insert system forms a compact unit that is simple to adapt to different front fork dimensions and that can also be used as a kit for providing an existing front fork with parallel damping.

BRIEF DESCRIPTION OF THE DRAWINGS

These and other features, aspects and advantages of the present invention will now be described with reference to the drawings of some preferred embodiments, which embodiments are intended to illustrate and not to limit the invention.

DETAILED DESCRIPTION OF THE PREFERRED EMBODIMENT

Figure 1:
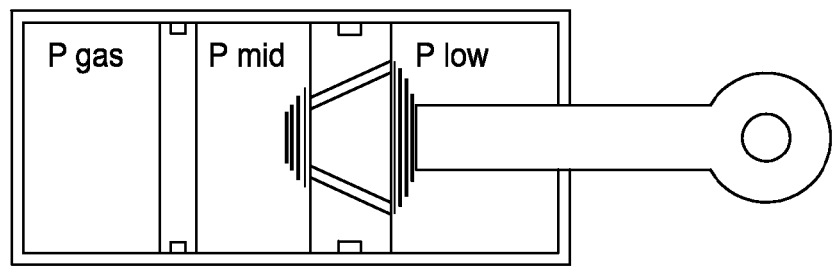
FIG. 1 shows a damper according to previously-known technology (De Carbon)
Figure 2:
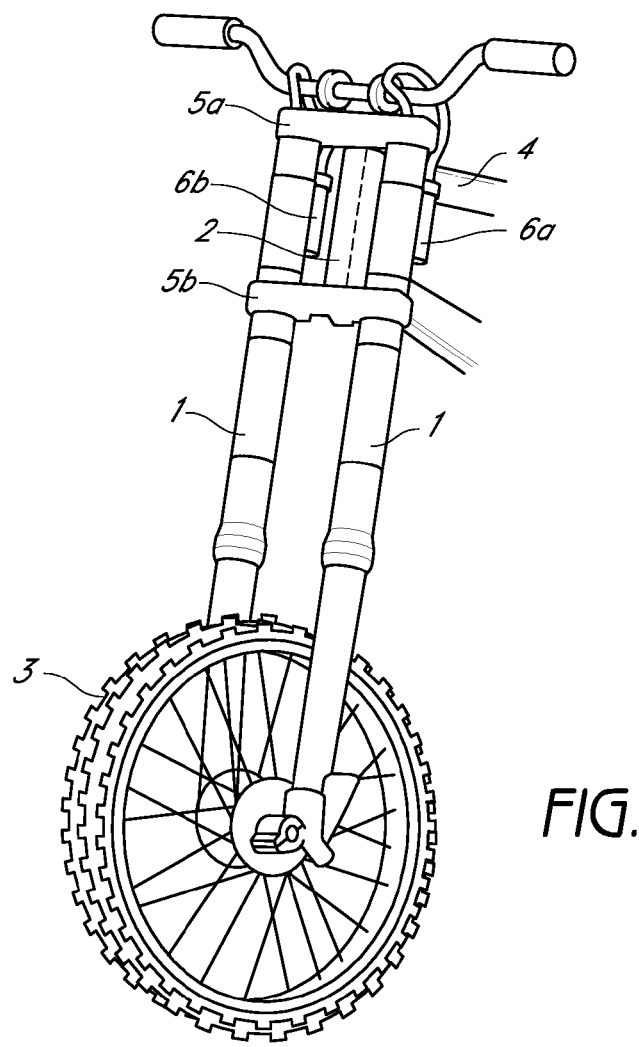
FIG. 2 shows a front fork mounted on a vehicle

FIG. 2 shows a front fork mounted on a vehicle, in this embodiment a motorcycle, of which only the front part is shown. Fork legs (1) are arranged on each side of a steering pillar (2). The lower parts of the fork legs (1) are attached to the wheel (3) and the upper ends are connected to the frame (4) via the top yoke and bottom yoke (5a, 5b). According to this embodiment, each fork leg (1) of the front fork has an external pressure chamber (6a, 6b) that is attached to the respective fork leg (1). Other fixing locations for the pressure chamber are possible, for example in the yoke, in the frame or on the steering pillar.

Figure 3:
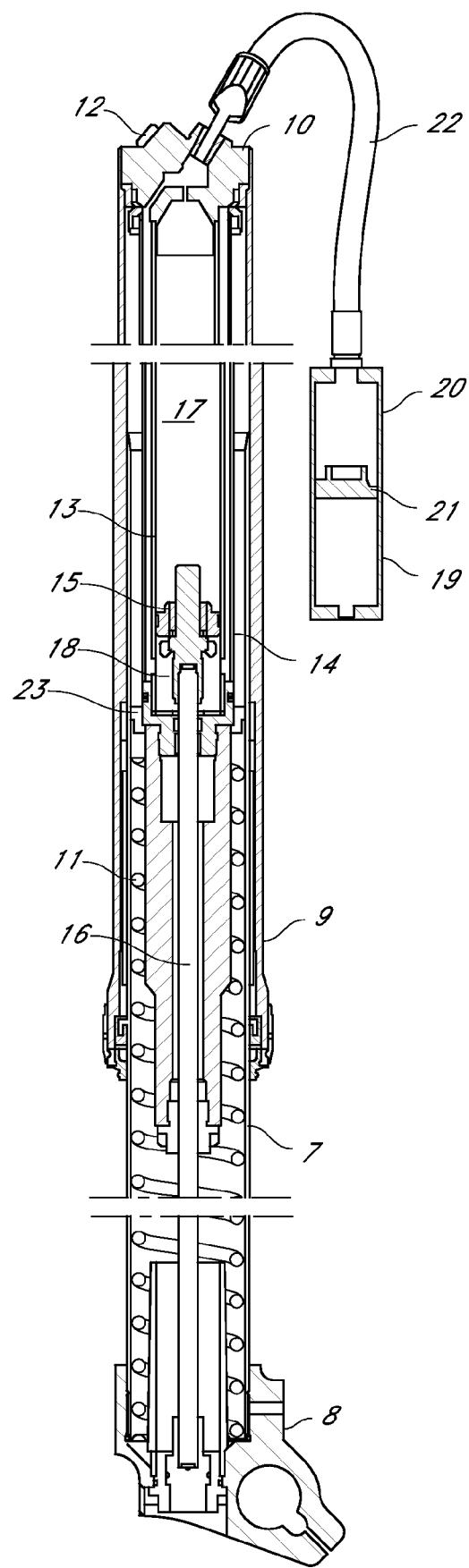
FIG. 3 shows a view of the front fork in cross section

FIG. 3 shows the front fork in cross section and its construction and function are described below in greater detail. The front fork comprises a lower inner leg (7) arranged on a bottom unit (8) and an upper outer fork leg (9) that terminates in a head (10) that seals the fork. A spring (11) is arranged in the lower inner leg (7) and the damping system is arranged in the upper outer leg. The damping system is constructed of a damping tube (13) and an outer tube (14) that together create a double tube construction that contributes to parallel flow. A shimmed damping piston (15) is arranged in the damping tube (13) on a piston rod (16), which piston (15) divides the damping chamber into a return chamber (18) and a compression chamber (17). During movement of the piston (15), the return chamber and the compression chamber alternate in being the high-pressure and low-pressure side.

At the upper end of the front fork, opposite to the bottom unit, the double tube is attached to the sealed-off head (10) that comprises valves (12, 12'). The valves (12, 12') can be used to adjust the pressure in the damping system to take into account both high and low speeds and both compression and return strokes. The valves (12, 12') are connected via separate connectors to a common pressurizing location comprising a pressurizing device (19). In this embodiment, the pressurizing device (19) is a container (20) divided by a piston (21) and pressurized by gas. A hose (22) is coupled (e.g., with a threaded coupler) to one end of the container. In the illustrated embodiment, the hose (22) connects together the container (20) and the head (10) of the front fork.

The damping tube (13) and the outer tube (14) together with the head (10), a tube end (23) and the pressurizing device (19) form an insert system that is simple to assemble and compact in size. The insert system can be adapted to be mounted in existing front forks on many different types of vehicles in order to obtain, in a simple way, a system with the advantages of parallel damping without having to buy a completely new product. With the compact insert system, it is also easy to dismantle and service the product.

One end of the piston rod (16) is attached to the bottom unit (8) on the front fork and the piston (15) is mounted at the other end. The piston rod (16) preferably is sealed against and extends through the tube end (23) of the insert system.

Figure 4:
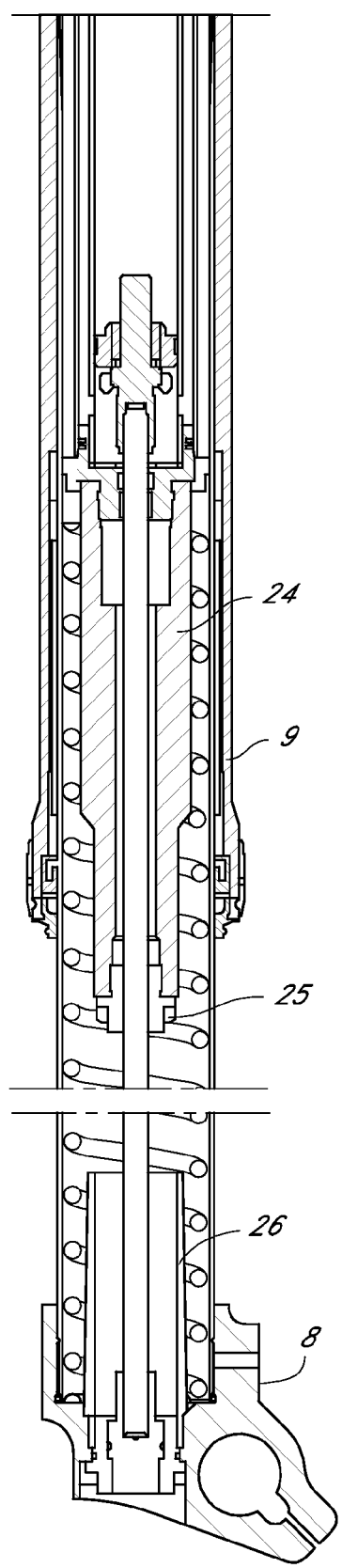
FIG. 4 shows a detail view of a lower part of the front fork

FIG. 4 shows an enlarged partial view of the lower part of the front fork. In order to support the piston rod at the joint, a spring support (24) is arranged around the piston rod. The spring support (24) fulfils two functions: giving the piston rod an extra point of support and providing a low-friction surface for the spring to move against.

A metallic part (25) is arranged at the end of the spring support (24). This part (25) interacts with, that is can be inserted into, a cylindrical part (26) that is attached to the bottom unit (8), in such a way that a hydraulic stop is created, which reduces the likelihood of the front fork bottoming in the event of unusually strong compression.

Figure 4A:
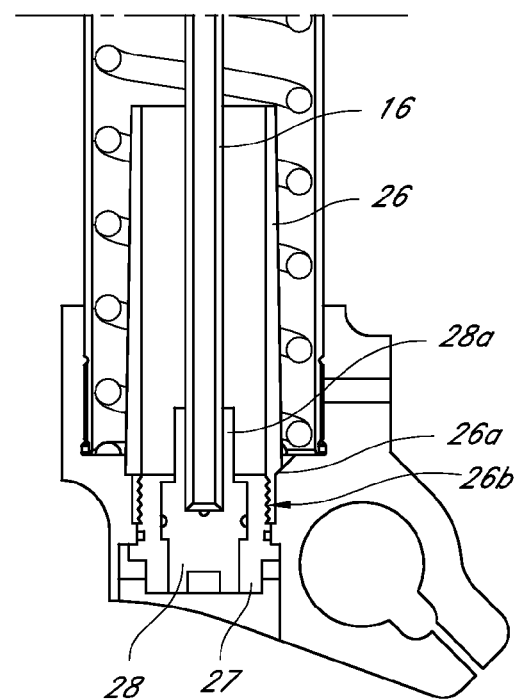
FIG. 4a shows a detail view of a hydraulic stop

The fact that the insert system is easy to dismantle from the front fork is also illustrated by FIG. 4a, which shows the lower part of the front fork. The figure shows that the lower part (26a) of the hydraulic stop (26) is pressed into the bottom unit (8) of the front fork by pressure force. A thread (26b) is arranged in the internal diameter of the hydraulic stop, so that a bottom part (27) can be screwed into the thread (26b). The bottom part (27) also comprises a seal (28) that reduces the likelihood of leakage from the front fork. The bottom-most part of the bottom part (27) is designed to be able to be attached or to be screwed in and out using a hexagonal key, so that the front fork is easy both to assemble and to dismantle. A piston rod holder (28a) can be integrated with the seal (28) that is threaded into this bottom part (27). The piston rod (16) is attached in a recess in the piston rod holder (28a) and the other part of the holder (28a) is screwed down from above into the abovementioned bottom part (27). Due to the fact that the holder (28a) can be screwed out of the bottom part (27), the front fork is simple to dismantle by withdrawing the whole insert in an upward direction.

Figure 5A:
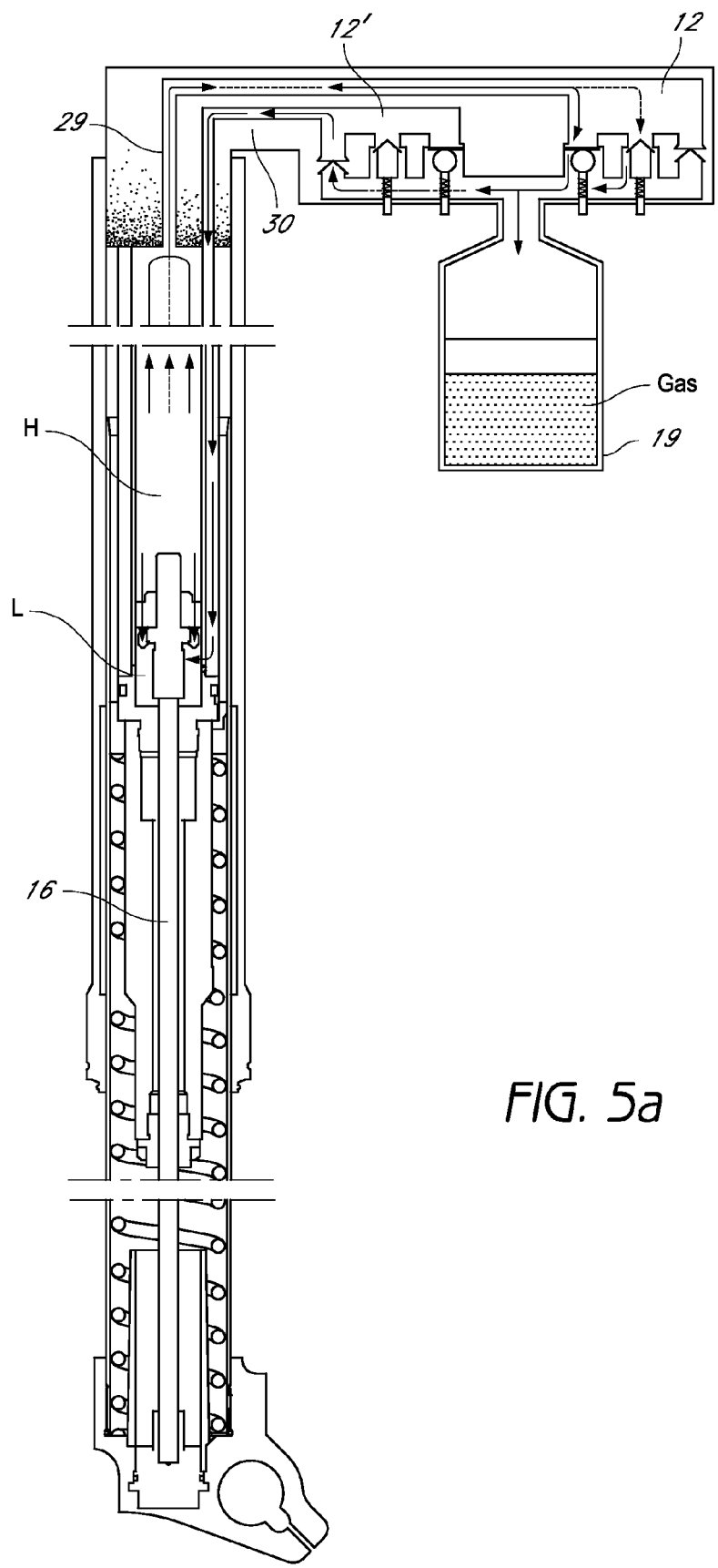
FIG. 5a shows a simplified view of the front fork in cross section with arrows illustrating the flow during a compression stroke
Figure 5B:
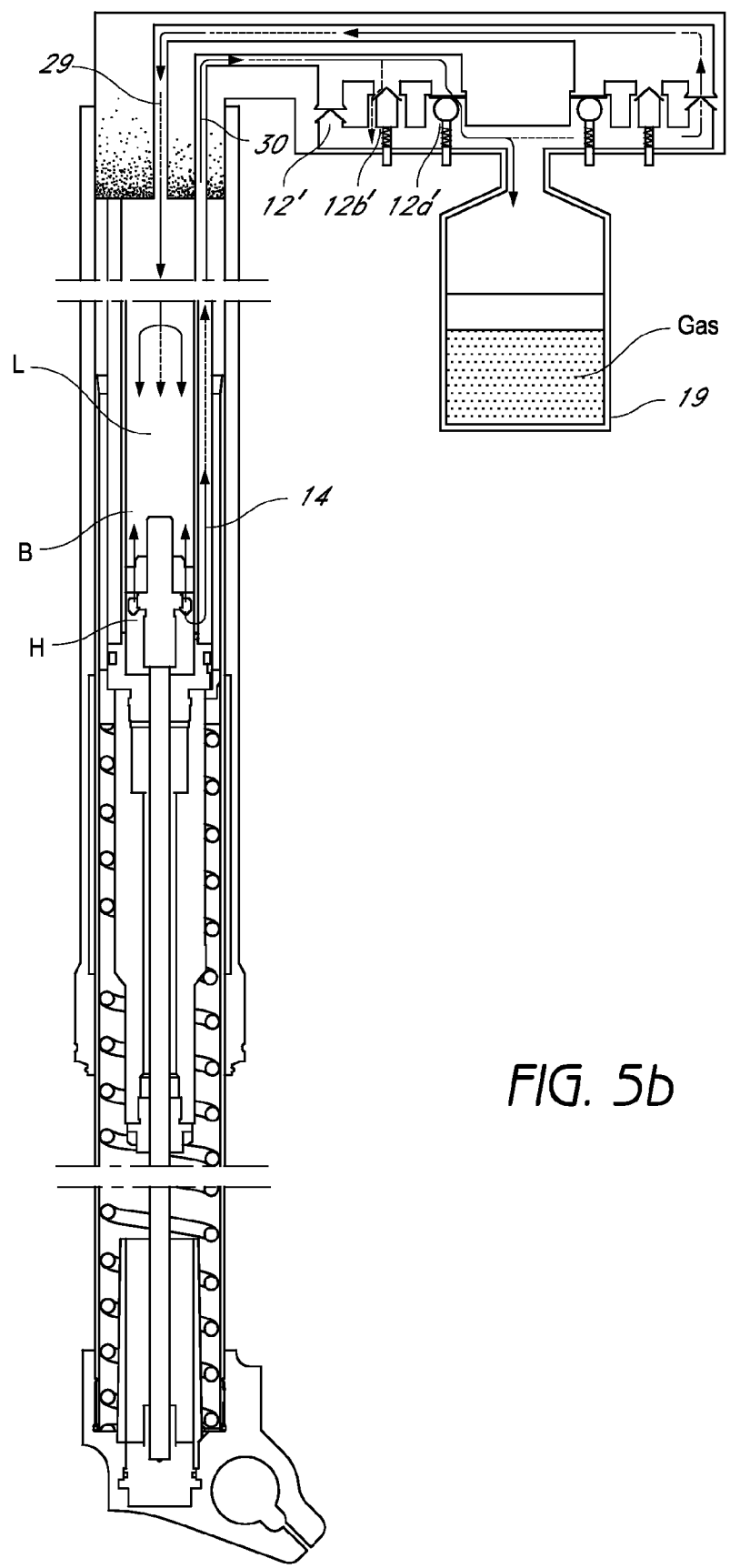
FIG. 5b shows a simplified view of the front fork in cross section with arrows illustrating the flow during a return stroke

FIGS. 5a and 5b show the flow in the front fork through different medium flow passages (29, 30) and through flow areas that are adjusted by valves (12a, 12b, 12a', 12b'). The valves comprise high-speed valves (12a, 12a'), low-speed valves (12b, 12b') and standard non-return valves (12c, 12c'). The different types of valve are already well known and will not be described in greater detail. The medium flow passages (29, 30) are arranged in such a way that they are parallel in relation to each other and are connected to the common pressurizing location, which comprises the pressurizing device (19) in the illustrated configuration. Because the passages (29, 30) are parallel, the flow is divided between the two medium-flow passage areas and the flow speeds in the system can essentially be reduced, for example halved, in relation to the actual speed of the longitudinal displacement movements. The flow speed in the medium is determined by the frequency of the movements or the size of the impacts and, with a lower flow speed, which greatly reduces the likelihood of uncontrolled build-up of pressure and forces that can otherwise arise in the system.

The high-pressure and low- pressure sides of the damper change with the direction of the stroke. As a result of the flow paths and the position of the valves, the pressure on the low-pressure side is always as high as possible and the likelihood of cavitation is greatly reduced.

During a compression stroke, FIG. 5a, the damping medium flows through the damping system as shown by the flow arrows in the figure. The solid arrows represent the compression flow when the front fork is subjected to a force with high speed and the broken arrows represent the compression flow when the speed of the force that is applied is low. That is, at high speeds, when parts of the damping medium on the high-pressure side (H) are pressurized by the shimmed piston (15), the remaining quantity of medium flows via a passage (illustrated in a simplified form by (29)) in the head (10) through the adjustable high-speed valve (12a) and the non-return valve (12c') through the space between the tubes (13 and 14) to the other side, that is the low-pressure side (L), of the piston. At low speeds that do not cause sufficient pressure to open the shim stack and the high-speed valve, the medium flows via the adjustable low-pressure valve (12b) via the same non-return valve (12c') to the low-pressure side (L). Pressurizing of the medium, by means of the pressurizing device (19), takes place parallel with the flow. The medium that is displaced by the piston rod (16) can be taken up by the container or any other component, mechanism or volume that acts as a pressurizing device (19).

During a return stroke, FIG. 5b, the damping medium flows according to the same principle but in the opposite direction to the compression direction described above, according to the flow arrows shown in FIG. 5b. The flow is thus partially directed straight through the piston (15) from the high-pressure side (H), and partially up through the space between the tubes (13, 14), via the passage (30) in the head (10), through the valve (12a' or 12b') dependent upon high or low speed, through the non-return valve 12c and then on to the low-pressure side (L) of the piston. Pressurizing of the medium is also carried out here parallel with the flow.

As the compression and return adjustments are separated, the valves (12a, 12a', 12b, 12b', can be adjusted independently of each other. The pressure therefore can be controlled in such a way that the build-up is greatest during the return or compression stroke, depending upon the external circumstances. The damping characteristics can thus be maximally adapted to suit the terrain, as a result of the large range of adjustment that the valves (12a, 12a', 12b, 12b') now have. The large range of adjustment of the valves means an adjustment of the medium flow area from anywhere between maximal and minimal area depending upon the damping force characteristics that are desired.

With parallel passages (29, 30) described above, the flow speed to a specific valve also can be reduced if the pressure on this valve becomes critically high. As the damping medium will take the easiest path (the lowest pressure) in the system, this adjustment capability means that a wide range of pistons (15) and pressurizing devices (19) can now be utilized. An advantage of this is that larger pistons can be used and, with larger pistons, the pressure does not need to be so high in the system and the damper has a smoother characteristic. By a smoother characteristic is meant that the increase in pressure, and also the increase in force, can take place without cavitation, irrespective of the setting.

Figure 6:
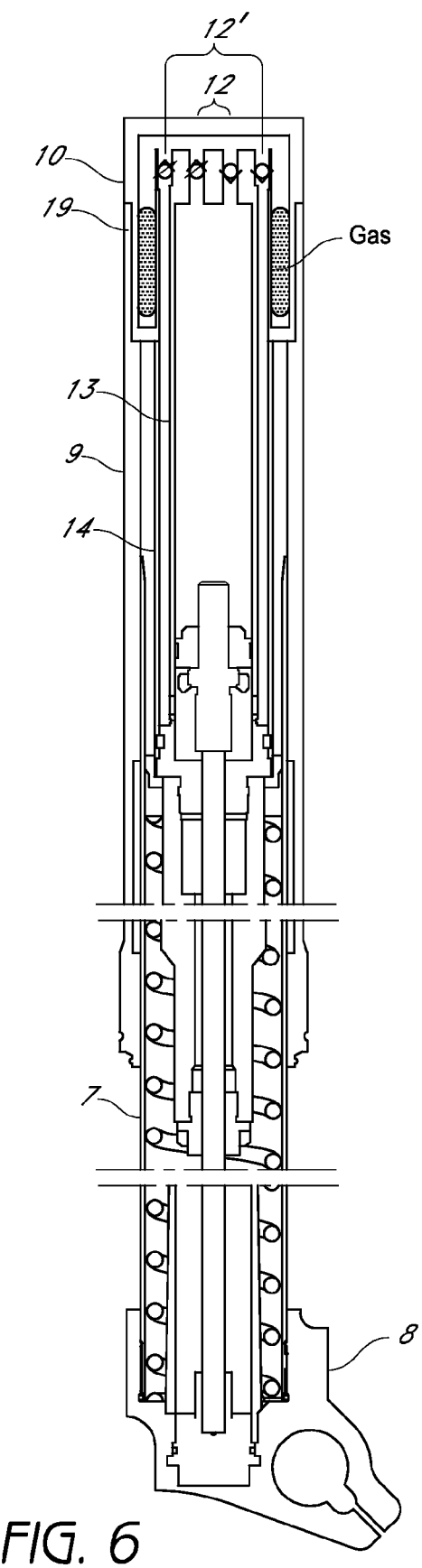
FIG. 6 shows another embodiment of the front fork with internal pressurized bellows as a pressurizing device.
Figure 6A:
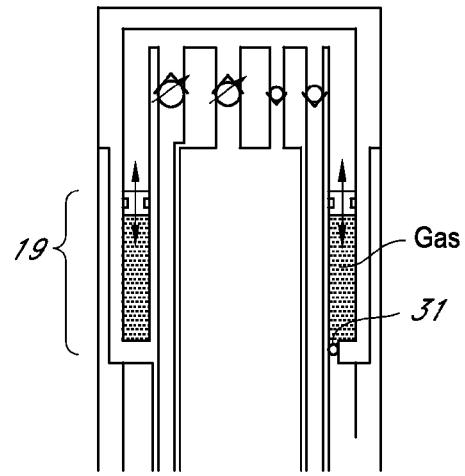
FIG. 6a is a detail view of a pressurizing device in the form of a movable piston pressurized by gas.
Figure 6B:
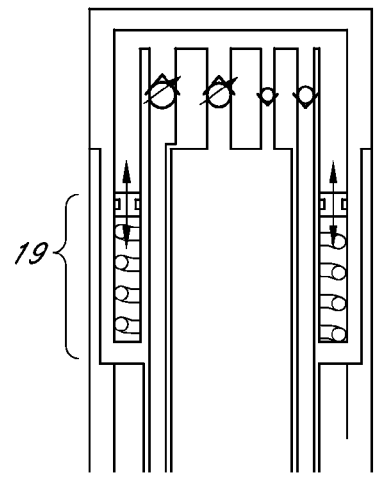
FIG. 6b is a detail view of a pressurizing device in the form of a movable piston pressurized by a spring.

FIG. 6 shows another configuration that is arranged and configured in accordance with certain features, aspects and advantages of some embodiments of the invention. The configuration illustrated in FIG. 6 preferably does not use an external pressurized container. In the illustrated embodiment, the front fork also comprises a lower inner leg (7) arranged on a bottom unit (8) and an upper outer fork leg (9) terminating with a head (10) that is sealed against the fork and upon which head the damping system is arranged. The valves (12, 12' (here drawn in a simplified way)) are arranged in the sealed head (10) and ducts in the head interconnect the pressurized spaces. The illustrated damping system is constructed of a damping tube (13) and an outer tube (14) that together form a double tube. A pressurizing part (19), for example a floating piston or bellows, can be arranged in a divided space outside the outer tube (14). The pressurizing part can comprise a piston that is pressurized by a volume of fluid, a spring, an elastic member or an expandable bellows, for example but without limitation. The pressurizing part absorbs the volume of damping medium that the piston rod (16) displaces during maximal compression. The reverse side of the floating piston is pressurized by gas (FIG. 6a), a spring (FIG. 6b) or the like and the bellows are pressurized by a compressible gas or the like. Because the whole damping unit can be removed, the gas pressure that pressurizes the damper can also be adjusted in a simple way, for example by having a filling valve (31) connected to the divided space or to the interior of the bellows (not shown). The bellows can, for example, be in the shape of a toroid that is sealed against the surroundings or a cylinder sealed against any one of the double tubes. As the pressurization of the illustrated front fork does not use of an external container, the front fork is easier to assemble and takes up less space.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

The invention claimed is:

1. A removable insert device for telescopic fork legs that comprise outer and inner legs and a damping system with a piston and piston rod arrangement arranged within a region defined at least in part by the outer and inner legs, the device comprising:

two generally concentric tubes, the two generally concentric tubes being distinct from the outer and inner legs of the telescopic fork legs such that the two generally concentric tubes can be inserted into and removed from within a region defined by the outer and inner legs of the telescopic fork legs, a first medium flow passage defined between the two generally concentric tubes;

a second medium flow passage and a third medium flow passage extending in parallel to each other and extending between an upper side of the piston and a lower side of the piston, the second medium flow passage extending between the upper side of the piston and the lower side of the piston via the first medium flow passage, the third medium flow passage extending through the piston between the upper side of the piston and the lower side of the piston, the third medium flow passage being fluidly coupled to the first medium flow passage;

a pressurizing member in fluid communication with the second and third medium flow passage;

the second medium flow passages comprising at least a first flow control device that is configured to adjust the damping characteristics of the fork legs to different types of terrain.

2. The device of claim 1, wherein a tube end is mounted to a first end of the two generally concentric tubes and a head is mounted to a second end of the two generally concentric tubes, the head also being coupled to the outer leg of the fork legs.

3. The device of claim 2, wherein the piston rod is sealed against and extends through the tube end.

4. The device of claim 2, wherein a first end of the piston rod is attached to a bottom unit, the bottom unit being connected to the inner leg, the piston being attached to a second end of the piston rod, and the piston being located within and operating within one of the two generally concentric tubes.

5. The device of claim 2, wherein the head encloses the first adjustable flow control valve and a second adjustable flow control valve, the first and second adjustable flow control valves being adapted for separate adjustment, the first adjustable flow control valve adapted to alter compression characteristics and the second adjustable flow control valve adapted to alter return characteristics.

6. The device of claim 1, wherein the first adjustable control valve is positioned along the second medium flow passage.

7. The device of claim 6 further comprising a second adjustable control valve that also is positioned along the second medium flow passage.

8. The device of claim 7, wherein a head is mounted to an upper end of the two generally concentric tubes, the first adjustable control valve and the second adjustable control valve being mounted within the head.

9. The device of claim 1, wherein a head is mounted to an upper end of the two generally concentric tubes, the first adjustable control valve and a second adjustable control valve being mounted within the head and being positioned such that fluid moving between the first medium flow passage and the second medium flow passage flows through at least one of the first adjustable control valve and the second adjustable control valve.

10. The device of claim 9, wherein the pressurizing member communicates with the first medium flow passage and the second medium flow passage at a location between the first adjustable control valve and the second adjustable control valve.

11. The device of claim 1 in combination with a vehicle.

12. The device of claim 1 in combination with a motorcycle.

13. The device of claim 1, wherein the pressurizing member comprises an external container.

14. The device of claim 1, wherein the pressurizing member comprises a piston that is pressurized by a volume of fluid, a spring, an elastic member or an expandable bellows.

15. The device of claim 1, wherein the pressurizing member is integrally formed between the outer leg of the front fork and the removable compact unit.

* * * * *